Nov. 15, 1932.     C. S. BRAGG ET AL     1,887,750
BRAKE SYSTEM FOR AUTOMOTIVE VEHICLES
Filed June 20, 1928     2 Sheets-Sheet 2
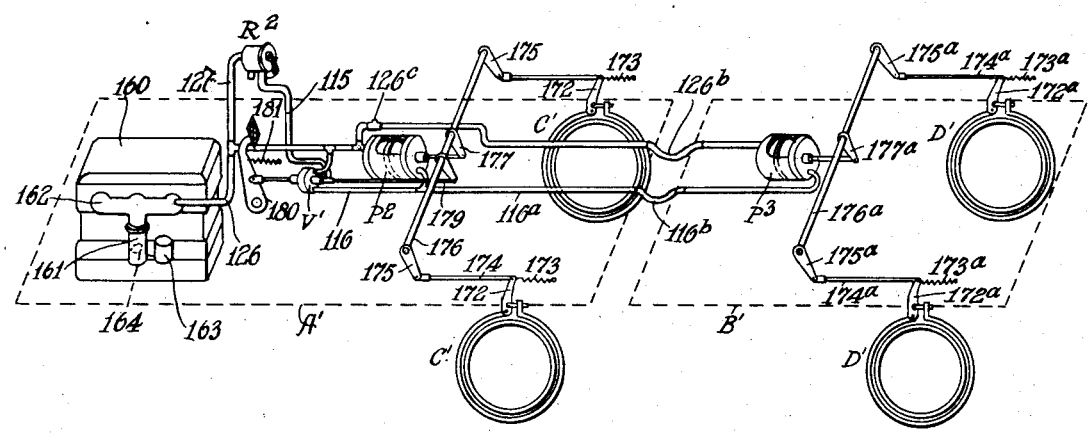
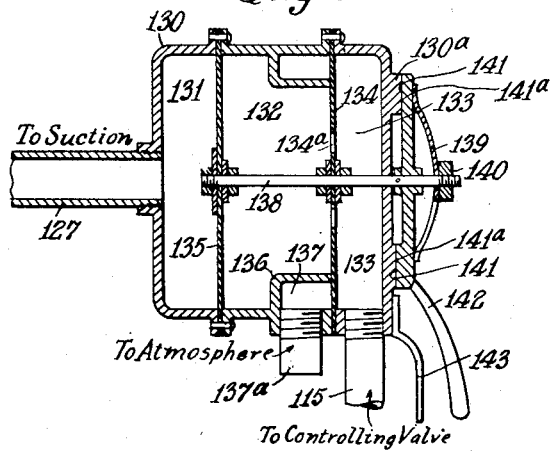
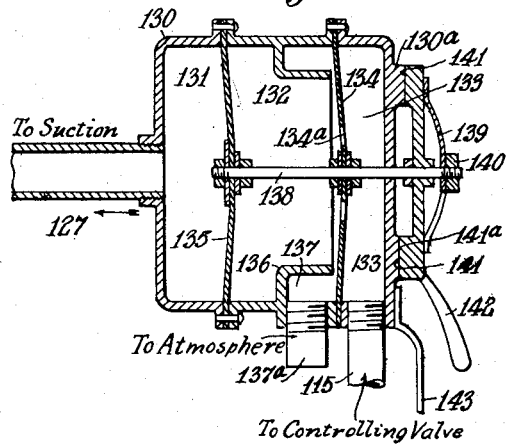

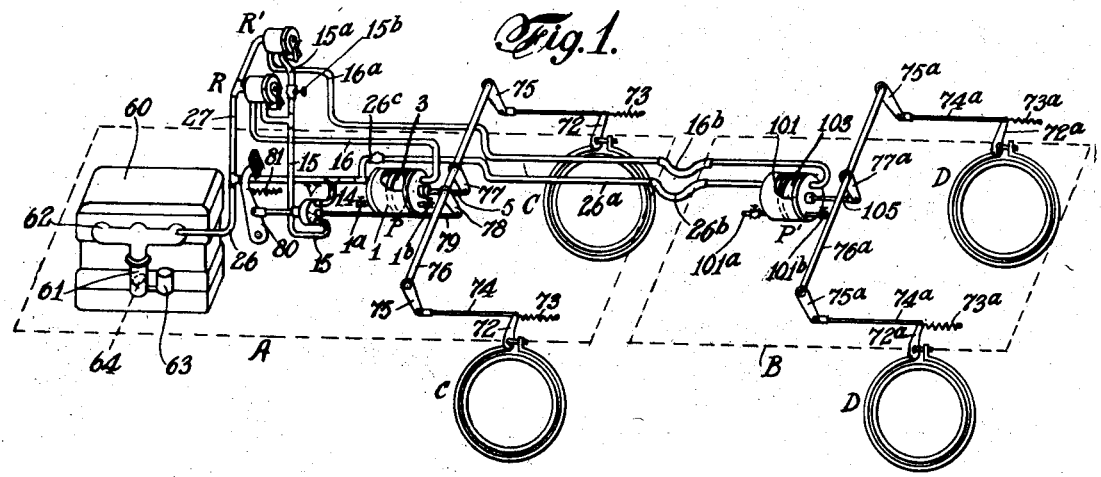
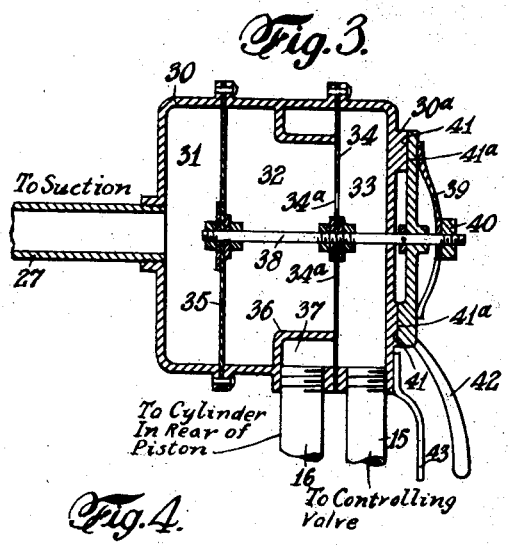
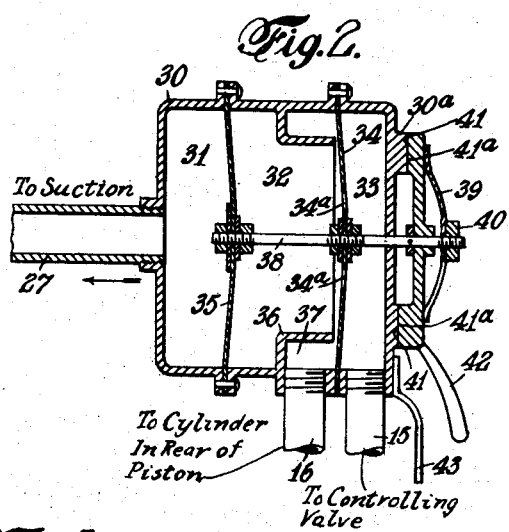
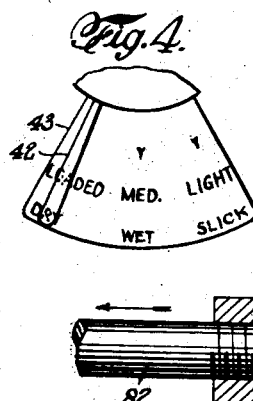
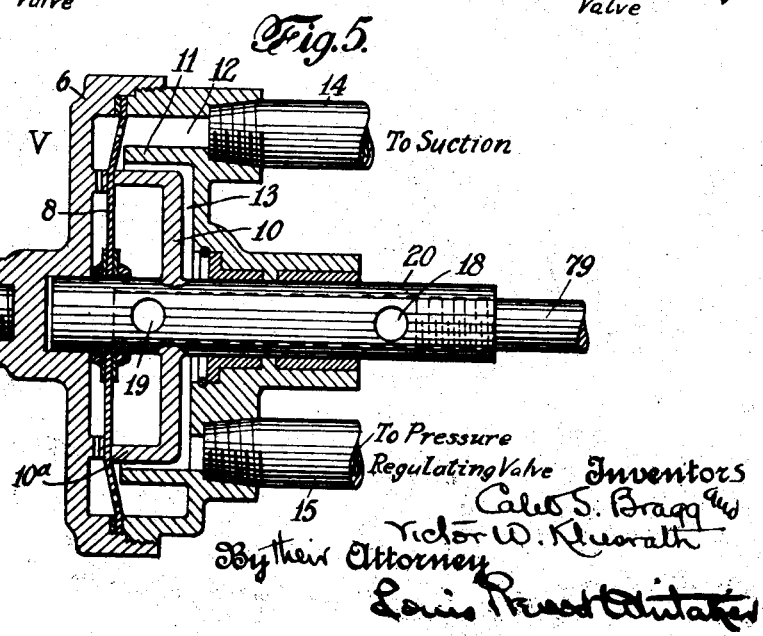

Patented Nov. 15, 1932

1,887,750

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed June 20, 1928. Serial No. 286,804.

Our invention consists in the novel features hereinafter described, reference being had to the accompanying drawings which show one embodiment of the same selected by us for purposes of illustration, and the said invention is fully disclosed in the following description and claims.

Our present invention relates to vacuum or suction actuated brake systems for automotive vehicles in which the suction or rarification is conveniently obtained by a connection to the throttle controlled portion of the suction passage of an internal combustion engine which drives the vehicle or vehicles and in which the higher pressure fluid, usually atmospheric air, is at a substantially constant pressure, and in which a movable part of the actuator, as a piston movable in a cylinder closed at both ends, is subjected to suction on its opposite faces, or in other words is submerged in vacuum when the parts are in the released position, and it consists in the provision of a pressure regulating valve located between the controlling valve mechanism and the suction actuated device, for automatically maintaining a constant and predetermined maximum differential of fluid pressures available for the operation of the suction actuated device, said pressure regulating valve being provided with means normally held in open position by yielding resistance, for disconnecting the high pressure portion of the actuator from the source of higher fluid pressure independently of the controlling valve mechanism under the control of a pressure operated part, which is subjected at all times on one face to the suction in said suction passage, and is subjected on the other face to the higher pressure fluid when available for the operation of the actuator. By this means the regulating valve will cut off further admission of the higher fluid pressure as soon as the differential of fluid pressures on said pressure operated part overcomes said yielding resistance, and the amount of such yielding resistance therefore predetermines the amount of power which the suction actuated device may exert on the brake mechanism connected therewith. The yielding resistance means is also provided with hand operated adjusting means for quickly varying its tension to meet changes in the coefficient of friction between the wheel tires and the road surface, which may be due to variations in road conditions, and also to variations in the load of the vehicle to the end that the operator may apply the brake mechanisms with the maximum force of the actuator, or actuators, without locking the wheels, upon the roadway over which the vehicle is passing.

Our invention also comprises certain novel features of construction and combination of parts hereinafter fully described and particularly pointed out in the claims.

In the accompanying drawings,

Fig. 1 is a diagrammatic view of an installation of brake mechanism for automotive vehicles in connection with a tractor and trailer, and showing our present invention embodied therein.

Fig. 2 is an enlarged sectional view of one of the pressure regulating valves shown in Fig. 1, the parts being illustrated in the released or normal position.

Fig. 3 is a similar view of the pressure regulating valve showing the parts in position to disconnect the high pressure fluid during a power stroke.

Fig. 4 is a detail view of an indicator plate with which the valve mechanism is provided.

Fig. 5 is a sectional view of one form of controlling valve mechanism for the actuator which may be employed in connection therewith.

Fig. 6 is a view similar to Fig. 1 showing a modified embodiment of our invention in which the pressure regulating valve is interposed between the air inlet for the controlling valve mechanism and the connection with the atmosphere.

Figs. 7 and 8 are sectional views of the pressure regulating valve similar to Figs. 2 and 3 with appropriate legends corresponding with Fig. 6.

In the diagram Fig. 1, we have shown the invention embodied for example in a brake system for two connected vehicles, as the tractor vehicle indicated in dotted lines at A, and a trailer indicated in dotted lines at B, each vehicle being provided with independently operable brake mechanisms adapted to be operated by a power actuator carried by the vehicle, said actuators being operable practically simultaneously under the control of a single controlling valve mechanism. The tractor vehicle is provided with an internal combustion engine, 60, for propelling both vehicles, having the usual suction passage, comprising a vertical passage, 61, and intake manifold, 62, carburetor, 63, and the usual throttle valve, 64, between the carburetor and the engine cylinders. The tractor, A, is provided with brake mechanisms here indicated at C, C, for as many wheels as desired and of any usual or desired character. The trailing vehicle, B, is likewise provided with brake mechanisms indicated at D, D, for as many wheels as desired and of any usual or desired type. In the present instance and merely for example, each brake mechanism is shown as of the drum and band type, provided with an operating lever, 72, and retracting spring, 73, and the brake mechanisms, C, C, are connected by links, 74, and arms, 75, with a cross shaft, 76, the corresponding levers of the trailer brakes, D, by link, 74ᵃ, and arm, 75ᵃ, with a corresponding cross shaft, 76ᵃ.

The tractor vehicle is shown provided with a main power actuator indicated at P, and comprising a cylinder, 1, closed at both ends, and having a piston, 3, the piston rod, 5, of which is connected to an arm, 77, on the rock shaft 76, for applying the tractor brakes. The trailer, B, is shown provided with a similar power actuator indicated at P¹, and having a cylinder, 101, closed at both ends, and a piston, 103, the piston rod, 105, of which is connected to an arm, 77ᵃ, on the rock shaft, 76ᵃ, for applying the trailer brakes. The cylinder of each actuator is connected with the suction passage of the engine between the throttle valve and the engine cylinders. In this instance we have shown the main suction pipe, 26, extending from the intake manifold to the forward end of the cylinder, 1, and a branch pipe, 26ᵃ, extending from the pipe, 26, to the forward end of the cylinder, 101, and provided with a flexible portion, 26ᵇ, between the vehicles. Each actuator in rear of the piston therein is also connected with the suction passage of the engine through the controlling valve mechanism, when the parts are in released position, as hereinafter explained, and the power actuators are operated by admitting air to the portions thereof in rear of their pistons, to effect a power stroke to apply the brakes and withdrawing this air to release the brakes, and permit them to be returned to their released positions by their retracting springs. V represents the controlling valve mechanism for both actuators, which may be of any desired construction, which will accomplish the above mentioned result. In order to facilitate the understanding of our present invention, we have illustrated in Fig. 5 one form of valve mechanism suitable for this purpose, the specific construction of which is covered by our former application for Letters Patent of the United States filed November 7, 1927, and given Serial No. 231,724, and which is therefore not claimed herein. This valve mechanism will be very briefly described therefore, merely for the purpose of enabling its operation to be understood. This valve mechanism comprises a valve casing, 6, provided with a diaphragm, 8, having its marginal portions in sealing engagement with the casing, and dividing the casing into two compartments. One of these compartments, at the right in Fig. 5, is provided with an annular seat indicated at 11, which divides the compartment into a central chamber, 13, adapted to be connected with the cylinder or cylinders to be controlled in rear of the piston or pistons thereof, and an annular suction chamber, 12, which is connected at all times with the suction passage of the engine by a pipe, indicated at 14. Within the chamber, 13, is a disc valve, indicated at 10, provided with an annular portion, 10ᵃ, adapted to seat upon the diaphragm, as shown in Fig. 5. 20 represents a valve actuating sleeve having a sealing connection with the diaphragm and disc valve within the casing, and extending to the exterior thereof, and provided with an air inlet aperture, 18, outside of the casing, communicating through said sleeve, and an aperture, 19, within the space between the disc valve, 10, and diaphragm, 8, for admitting air (or other higher pressure fluid). There is a slight relative movement possible between the valve actuating sleeve, 20, and the valve casing, 6, limited by the engagement of the disc valve, 10, with the adjacent wall of the casing, and the valve mechanism is preferably interposed in linkage between the operator operated part and certain of the brake mechanisms, so that after the valve mechanism has been operated to apply the brakes by power, the operator may apply his physical force to said brake mechanisms connected with said linkage, and this also permits such brake mechanisms to be applied by the physical force of the operator in case of failure of power. In the present example, 80, represents a pedal lever on the tractor, which may be provided with the usual retracting spring, 81, said lever being connected by a link, 82, with the valve casing, 6, the valve actuating sleeve, 20, being connected by a link rod, 79, with an arm, 78, on the rock shaft, 76, which actuates the brake mechanisms, C, C, of the tractor vehicle. The suction pipe, 14, connected with the valve mechanism, is shown connected with the main suction pipe, 26, and the chamber, 13, of the valve mechanism is connected by a pipe, 15, with each of the actuators, P and P¹, through a pressure regulating valve, (R or R¹, Fig. 1), hereinafter described, constructed as illustrated in Figs. 2 and 3.

One form of the pressure regulating valve which we prefer to employ for this purpose is illustrated in Figs. 2 and 3, in which 30 represents the valve casing conveniently formed in three sections bolted or otherwise secured together, and provided with a movable valve and a movable pressure operated part connected therewith, which serve to divide the interior of the casing into three chambers, indicated at 31, 32 and 33. The valve member indicated at 34, is preferably in the form of a diaphragm having its marginal portions in sealing engagement with the casing, and preferably clamped between the adjacent sections thereof, and the pressure operated part, indicated at 35, is also preferably in the form of a diaphragm, having marginal portions in sealing engagement with the casing and clamped between adjacent sections thereof in a similar manner. The pressure operated part or diaphragm, 35, is impervious and separates the chambers, 31 and 32, at all times. The chamber, 31, which we term the suction chamber, is connected at all times with the suction passage of the engine by a pipe, 27, which may be conveniently connected with the main suction pipe, 26, as shown in Fig. 1, so that the adjacent face of the diaphragm, 35, is always exposed to the degree of rarification existing in the manifold, which when the throttle valve is closed or partially closed, (the proper position for the throttle valve when the brakes are to be applied) is substantially equivalent to 20 inches of mercury or about 10 pounds per square inch, and is substantially constant under those conditions. The opposite face of the diaphragm, 35 is exposed at all times to the pressure in the intermediate chamber, 32, which we term the variable pressure chamber, and in the chamber, 33, said chambers being connected by means of apertures, indicated at 34ª, in the diaphragm, 34. The chamber, 32, is provided with a valve seat, indicated at 36, preferably annular for engaging the valve member, 34, and providing a chamber, 37, which is separated from the central chamber, 32, when the diaphragm valve member, 34, is seated, as shown in Fig. 3, but which is in communication with the chambers, 32 and 33, when the diaphragm is unseated, as shown in Fig. 2. The pressure operated part, 35, and the valve member, 34, are connected for joint operation with each other, in this instance by a stem or rod, 38, sealingly connected therewith, and said rod is also connected with a yielding resistance tending to hold the parts in the position indicated in Fig. 2, with the valve member, 34, unseated. Means are provided for calibrating the yielding resistance spring to secure the desired initial tension thereof, and hand operated adjusting means are also provided for varying the tension of the resistance means to accommodate variations in the co-efficient of friction between the wheels and the roadway under the different road and load conditions. In Figs. 1 and 2 we have shown the yielding resistance in the form of a spring spider, 39, having an aperture in the center, engaging the stem or road, 38, which is provided with a nut, 40, engaging a threaded portion of the stem or rod, to accurately calibrate the spring. The outer ends of the spider, 39, rest upon a rotatable disc or plate, 41, mounted on the rod or stem, 38, adjacent to the exterior of the valve casing, the contacting portions of the disc or plate, 41, and the casing being provided with cam portions, indicated at 30ª and 41ª, in a well known way, so that when the disc or plate, 41, is rotated in one direction, the force exerted on the rod, 38, by the spring spider will be increased and when the plate is rotated in the opposite direction the tension of the spring spider will be decreased. The plate or disc, 41, is provided with a hand piece, 42, which extends over a scale indicated at 43, secured to the casing, and having a portion shown in Fig. 4, provided with indications such as,

| Loaded | Medium | Light |
|--------|--------|-------|
| Dry    | Wet    | Slick | to indicate variations in the load and road conditions which effect the co-efficient of friction between the wheels and the roadway, the said indications being so placed as to indicate the proper position of the hand piece, 42, to secure the proper adjustment of the spring, 39, for such conditions. The chamber, 33, of the valve casing is connected to the controlling valve mechanism, in this instance to the chamber, 13, thereof, by a pipe, 15, and the chamber, 37, of the pressure regulating valve is connected by a suitable pipe, 16, with the portion of the actuator which is to be controlled by the pressure regulating valve in rear of the piston of the actuator. In a brake mechanism in which a plurality of actuators are employed, they may all be connected with a single pressure regulating valve where it is desired to have them act under the same differential of fluid pressures, but where as in Fig. 1, separate actuators located on a tractor and trailer are employed, it will be desirable to connect the main controlling valve mechanism with each actuator in rear of the piston thereof, through a separate pressure regulating valve, as therein shown, and in such case the pipe, 15, leading to the pressure regulating valve, R, for the main actuator, P, will be provided with a branch pipe, 15a, communicating with the chamber, 33, of the pressure regulating valve, R′, and the chamber, 37, of the pressure regulating valve, R′, will be connected by an auxiliary pipe, 16a, having a flexible connection, 16b, between the vehicles, with the cylinder, 101, of the auxiliary actuator on the trailer in rear of the piston thereof. The branch pipe, 15a, may also be provided, as shown, with a cut-off cock, 15b, and the branch pipe, 26b, is provided with a cut-off cock, 26c, which cocks can be closed when the trailer is not used.

Assuming that the engine is running and that the throttle valve, 64, is closed or partly closed, air will be exhausted from the forward end of each actuator cylinder through the pipes, 26 and 26a, and from the chamber, or chambers, 31, of the pressure regulating valve, or valves, through pipe, 27. Assuming further, that the controlling valve, V, is in the released position, closing off the source of higher pressure, as indicated in Fig. 5, air will be withdrawn from the chambers, 32 and 33, of pressure regulating valve, or valves, and the spring, 39, will open the valve, 34, and air will be withdrawn from the cylinders in the rear of the pistons through pipes, 16 and 16a. There will be an equalization of pressures on opposite faces of the diaphragm, 35, so that it will offer no appreciable resistance to the spring, 39, which will hold the valve member, or diaphragm, 34, in unseated position, as shown in Fig. 2, with a predetermined resistance, determined by the adjustment of the calibrating means, 40, and the position of the hand lever, 42, with respect to the scale, 43, which regulates the tension of the spring. It will be seen, therefore, that the valve member or diaphragm, 34, of each pressure regulating valve will be held in unseated position, so as to place the cylinder with which it is connected, in rear of the piston in communication with the controlling valve mechanism, until the diaphragm, 35, is subjected to a differential of fluid pressures sufficient to overcome the tension of the spring, 39, when the diaphragm, 35, will be moved in the direction of the arrow in Fig. 2, and seat the valve member or diaphragm, 34.

To effect an application of the brake mechanism, the operator will place his foot on the pedal lever, 80, and move it forward, thereby shifting the valve casing, 6, with respect to the valve actuating sleeve, 20, in the direction of the arrow in Fig. 5, so as to seat the diaphragm valve, 8, on the seat, 11, to disconnect the suction chamber, 12, from the chamber, 13, and thereafter unseat the disc valve, 10, from the diaphragm, 8, to place the chamber, 13, in communication with the atmosphere (or other source of higher pressure fluid at substantially constant pressure) when the air or other higher pressure fluid will enter the chamber, 13, and pass through the pipe, 15, and branch pipe, 15a, and through chambers 33, 32, and 37, of the respective pressure regulating valves to the actuator cylinders, 1 and 101, in rear of the pistons therein. Pressure will immediately begin to build up in each cylinder in rear of the piston and in each of the pressure regulating valves on the inner face of the pressure operated diaphragm, 35, thereof, and the pistons will be moved forward to apply the brake mechanisms connected therewith substantially simultaneously. The pressure exerted by each actuator upon the brake mechanisms connected therewith will gradually increase to the maximum if the brakes are fully applied unless the pressure within the connected pressure regulating valve reaches a point where the differential of fluid pressures on opposite faces of the diaphragm, 35, thereof, becomes sufficient to overcome the resistance of the spring, 39, when the diaphragm, 35, will flex in the direction of the arrow Fig. 2, and seat the valve member or diaphragm, 34, thereby disconnecting the pressure end of the connected actuator cylinder from the source of higher fluid pressure and holding the brake mechanisms as applied with a predetermined amount of pressure according to the adjustment of the tension of the adjusting spring, 39. If the spring, 39, is given its maximum tension by turning the hand piece, 42, to the position on the scale indicated by the words "Loaded and dry" for example, the actuators will exert the maximum power on the brake mechanisms, that is to say, their pistons will be subjected to the maximum differential of fluid pressures, and the said actuators and the leverages in the connections between them and the brake mechanisms with which they are connected, will preferably be so constructed that the maximum power of the actuators can be exerted upon the brake mechanisms without locking the wheels on ordinary dry pavements when the vehicles are carrying their normal load.

If in the operation of the vehicle or vehicles, a piece of roadway which is either wet or icy is encountered, the operator can instantly shift the hand piece, 42, to the appropriate indication on the scale, 43, thereby lessening the tension of the resistance spring, 39, so that a lesser accumulated pressure within the associated pressure regulating valve will be required to overcome the resistance of the spring, 39, and seat the valve member or diaphragm, 34, thus enabling the brakes to be applied by the connected actuator to a lesser maximum extent and without locking the wheels, the spring, 39, can also be adjusted in like manner to accommodate variations in the load conditions of the vehicle or vehicles. It may frequently happen that the tractor is heavily loaded while the trailer is lightly loaded, or vice versa, and by employing a plurality of pressure regulating valves as at R and R¹, in Fig. 1 for example, each actuator may be operated to apply a different amount of power to the brakes connected therewith, under the control of its pressure regulating valve according to the particular load conditions.

It will be seen that a power stroke of either actuator to apply the brake mechanisms connected therewith, will not have the effect of admitting any appreciable quantity of air from the forward end of the actuator cylinder to the suction passage of the engine since the forward end of each actuator cylinder is at all times maintained in a condition of rarification, and therefore, there is no danger of stalling the engine if idling by an application of the brakes, which otherwise might occur with the effect of putting at an end the suction on which the operation of the power actuator, or actuators, depends. It will also be seen that when the brake mechanisms have been applied by the power actuators to the maximum extent permitted by the adjustment of the pressure regulating valve, the operator by further depressing the foot lever, 80, so as to bring the rear wall of the valve casing into contact with the disc valve, 10, may apply his physical force to the brake mechanisms, C, C, of the tractor vehicle, with which the rod, 79, is connected, and said brake mechanisms may also be applied by physical force alone in case of failure of power for any reason.

To release the brake mechanisms, it is only necessary for the operator to release his pressure on the foot lever, 80, or remove his foot therefrom altogether, thereby permitting the controlling valve casing, 6, to move rearwardly so as to again seat the disc valve, 10, on the diaphragm, 8, and unseat said diaphragm from the seat, 11, thereby again connecting chamber, 13, with the suction chamber, 12, and withdrawing the air previously admitted from the chambers, 32 and 33, of the connected pressure regulating valves. As soon as the pressure within the chambers, 32 and 33, of each pressure regulating valve has been sufficiently reduced, so that the differential of fluid pressures on the diaphragm, 35, no longer overcomes the tension of spring, 39, said spring will shift the rod, 38, in a direction opposite that of the arrow in Fig. 2, and unseat the valve member, 34, permitting the air in the connected actuator cylinder in rear of the piston to be withdrawn to permit the connected brake mechanisms to release themselves under the action of their retracting springs, which will return the brake mechanisms and the connected actuator pistons to their off or released postion. Obviously the operator may, by only partially releasing the foot lever, 80, effect a partial release of the brake mechanism by withdrawing only a small portion of the air previously admitted, and the operator can reapply the brakes by a forward movement of the foot pedal to admit a corresponding quantity of air to the actuators in rear of their pistons, and the brake mechanisms may be thus released and reapplied in rapid succession where this is desirable, as on long hills and in traffic, but whenever the operator removes his foot from the foot lever, 80, the brake mechanisms will be returned together with the actuator piston, or pistons, connected therewith to the off or released position.

It will thus be seen that notwithstanding the fact that there exists at all times a substantially constant differential of fluid pressures amounting to approximately 10 pounds per square inch, at sea level available for the operation of the power actuator, or actuators, a lesser maximum differential of fluid pressures may be provided for the operation of each actuator by properly adjusting the resistance spring of the pressure regulating valve therefor, so that the admission of higher fluid pressure will be cut off when a lower differential of fluid pressure exists on opposite faces of the pressure operated part, 35. In other words, the variations in the maximum differential of fluid pressure available to each actuator is secured by automatically cutting off the supply of higher fluid pressure on one face of the actuator piston, the opposite face of which is at all times exposed to the maximum rarification in the suction passage of the engine.

It will be understood that either of said pressure regulating valves, R or $R^1$, for example, may be employed to regulate the power applied by a plurality of power actuators. For example in Fig. 1, we have shown the actuator cyclinder, 1, provided at its opposite ends with pipes, $1^a$, $1^b$, through which the valve mechanism, V, may be connected to the corresponding portions of other actuating cylinders if desired, said pipes being shown provided with cut-off cocks for closing them when not in use, and the cylinder, 101, is likewise shown provided with similar pipe connections, $101^a$ and $101^b$, having similar cut-off cocks therein.

In Fig. 6 we have shown a diagrammatic view similar to Fig. 1, of a slight modified embodiment of our invention in which a pressure regulating valve is interposed in the connection between the air inlet for the controlling valve mechanism of an actuator, or actuators, and the atmosphere, so that it will regulate the amount of air admitted to the controlling valve mechanism and the actuator, or actuators controlled thereby. In this figure the parts corresponding to those shown in Fig. 1 are given the same reference characters, with the addition of 100, and in Figs. 7 and 8 we have shown the valve mechanism illustrated in Figs. 2 and 3 with appropriate legends corresponding with Fig. 6, to facilitate the understanding of this embodiment of our invention, the reference numerals in these figures being also the same as those in Figs. 2 and 3, with the addition of 100, to avoid unnecessary description.

In Fig. 6, C', C', represent brake mechanisms for the tractor vehicle, indicated by dotted lines, at A', and D', D', represent brake mechanisms for a trailing vehicle, indicated by dotted lines at B', the power actuator for the main vehicle being indicated as a whole at P², and the trailing vehicle being provided with an actuator, indicated at P³, the said actuators and their connections with the brake mechanisms of their respective vehicles being exactly as hereinbefore described. The controlling valve mechanism, indicated at V', is identical with the construction shown in Fig. 5 and previously described. In this instance the suction pipe, 126, is connected with the valve mechanism, and with each of the actuators to be controlled thereby, on the forward side of the piston thereof in exactly the same manner as hereinbefore described, and a branch pipe, 127, from the suction pipe, 126, is connected to the pressure regulating valve, R2, so as to communicate with the suction chamber, 131, in the same manner as previously described, so that the adjacent face of the diaphragm, 135, will be subjected to suction at all times when the engine is in operation and the throttle valve closed or partly closed. In this instance instead of connecting each of the actuator cylinders in rear of its piston with the pressure regulating device, as in Fig. 1, such portions of each actuator cylinder are connected directly with the chamber, 13, of the controlling valve mechanism, in this instance by a connecting pipe, 116, provided with an extension, 116a, having flexible connections, 116b, between the vehicles. In this instance the air inlet aperture, 18 (see Fig. 5) is connected by a pipe, 115, with the chamber, 133, of the pressure regulating valve, while the chamber, 137, thereof is directly connected with the atmosphere by a suitable aperture or pipe, 137a, open at its outer end. It follows from this construction that all of the air admitted to the controlling valve mechanism to effect the operation of the actuator or actuators controlled thereby must enter the pipe, 137a, when the diaphragm, 134, is unseated from the seat, 136, and pass into the chamber, 132, and through the apertures, 134a, into the chamber, 133, and thence through the pipe, 115, to the chamber, 13, of the controlling valve mechanism, as indicated in Fig. 7, the diaphragm, 134, being held unseated by the spring, 139, as previously described until a sufficient pressure is accumulated in the power actuator or actuators in rear of the piston, or pistons, and in the chamber, 132 acting upon diaphragm, 135, to overcome the resistance of the spring, 139, and seat the diaphragm, 134, thereby limiting the amount of pressure which can be applied to the actuator pistons and by them to the brake mechanisms connected therewith, in accordance with the tension to which the spring, 139, is adjusted.

When the engine is running and the throttle valve is closed, or partly closed, and the controlling valve is in the released position shown in Fig. 5, it will be seen that the rear end of each actuator cylinder will be connected through the controlling valve mechanism with the suction pipe, and as the forward ends of the actuator cylinders are always connected with the suction pipe, the pistons of the actuators will be maintained normally submerged in vacuum. Rarification will always exist in the chamber, 131, of the pressure regulating valve.

Chambers, 132 and 133, will be connected with the atmosphere, or cut off therefrom, depending upon the position of the diaphragm, 134. In the released position of the brake mechanisms the chambers, 132 and 133, are cut off from the actuator cylinders in rear of their pistons by the seated disc valve member, 10, and the position of diaphragm, 134, with respect to its seat will depend upon the amount of rarification in the suction passage of the engine and in the chamber, 131, with which it is directly connected, and the air tightness of the engagement between the diaphragm, 134, and valve member, 10, with their respective seats. When the operator desires to apply the brakes, he depresses the foot lever as previously described so as to effect a relative movement between the valve casing and valve actuating part of the controlling valve mechanism (Fig. 5) to close off the communication between the rear ends of the actuator cylinders and suction by the seating of the diaphragm valve, 8, and unseating the disc valve, 10, which will connect the cylinders in rear of the pistons with chambers, 132 and 133, of the pressure regulating valve, through pipe, 115. As the cylinder in rear of the pistons are in a condition of vacuum this will effect an equalization of pressures on the diaphragm, 135, the other side of which is subjected to the vacuum in chamber, 131, and will permit the spring, 139, to move the diaphragm valve, 134, from its seat and admit atmospheric air which passes through the apertures, 134a, chamber, 133, and pipe, 115, to the controlling valve mechanism, and to the cylinders of the actuator in rear of their pistons and effects a power stroke of the actuator, or actuators to apply the brakes connected therewith. When sufficient pressure has accumulated in the actuator cylinder or cylinders in rear of the piston, or pistons, and in the chambers, 132 and 133, to act upon diaphragm, 135, and overcome the resistance of the spring, 139, the diaphragm valve, 134, will be seated by the movement of diaphragm, 135, and no more air will be admitted, regardless of the position of the controlling valve mechanism.

When the operator releases the pedal lever, the valve, 10, seats, closing off communication from the atmosphere through the pressure regulating valve to the actuator cylinders in rear of the pistons, and thereafter reconnecting them with suction, and after the disc valve, 10, is seated, it makes no difference whether chambers, 132 and 133, of the pressure regulating valve are filled with air or are in a state of rarification.

What we claim and desire to secure by Letters Patent is:—

1. In a brake system for automotive vehicles provided with an internal combustion engine for propelling the same, having a throttle controlled suction passage, the combination with a plurality of power actuators, each comprising a cylinder closed at both ends, and a piston in said cylinder, independently operable brake mechanisms connected with said pistons, means for connecting each of said actuator cylinders on one side of the piston therein at all times with said suction passage, a single controlling valve mechanism for connecting each of said cylinders on the opposite side of said piston therein alternatively with said suction passage and with a source of higher fluid pressure, and an operator operated part for said controlling valve mechanism, of a pressure regulating valve for each actuator interposed between said controlling valve mechanism and the portion of the actuator cylinder connected therewith, for automatically disconnecting said portion of the cylinder from the source of higher pressure when said pressure regulating valves are subjected to a predetermined differential of fluid pressures, whereby said actuators may be operated substantially simultaneously to apply power to the brake mechanism connected with each actuator to a maximum extent determined by the pressure regulating valve therefor.

2. In a brake system for automotive vehicles provided with an internal combustion engine for propelling the same, having a throttle controlled suction passage, the combination with a plurality of power actuators, each comprising a cylinder closed at both ends, and a piston in said cylinder, independently operable brake mechanisms connected with said pistons, means for connecting each of said actuator cylinders on one side of the piston therein at all times with said suction passage, a single controlling valve mechanism for connecting each of said cylinders on the opposite side of said piston therein alternatively with said suction passage and with a source of higher fluid pressure, and an operator operated part for said controlling valve mechanism, of a pressure regulating valve for each actuator interposed between said controlling valve mechanism and the portion of the actuator cylinder connected therewith, each comprising a valve member for disconnecting said portion of the cylinder from the source of higher pressure during a power stroke of the actuator, a yielding resistance for normally holding said valve member in open position, and a movable pressure operated part connected with said valve member and said resistance, and subjected at all times on one face to the suction of said suction passage and on the opposite face to said suction and to the higher fluid pressure under the control of the controlling valve mechanism, and independent hand operated means for regulating the tension of the yielding resistance for each pressure regulating valve.

3. In a brake system for automotive vehicles including a tractor and trailer, provided with an internal combustion engine located on the tractor for propelling the vehicles, having a throttle controlled suction passage, the combination with a power actuator located on the tractor, comprising a cylinder closed at both ends and a piston in said cylinder connected with brake mechanisms for the tractor, a power actuator located on the trailer, comprising a cylinder closed at both ends, and a piston therein connected with brake mechanisms for the trailer, tubular connections for connecting each of said cylinders forward of their pistons at all times with the suction passage of the engine, a single controlling valve mechanism on the tractor, tubular connections therefrom to each cylinder in rear of the piston, means for connecting said valve mechanisms with the suction passage and with a source of higher fluid pressure, and an operator operated part for said controlling valve mechanism located on the tractor, of an independent pressure regulating valve in the connections between said controlling valve and each of said actuator cylinders, provided with a valve member for closing said connections, a yielding resistance normally holding said valve member in open position, a pressure operated part subjected on one face at all times to the suction of the suction passage and on the other face to said suction and to the higher pressure fluid under the control of said valve mechanism, connections between said pressure operated part and said valve and said yielding resistance, and hand operated means for varying the tension of said yielding resistance, whereby said actuators may be operated substantially simultaneously to apply the brake mechanisms of tractor and trailer to a maximum extent as to each, determined by the pressure regulating valve therefor.

4. In a brake system for automotive vehicles including a tractor and trailer, provided with an internal combustion engine located on the tractor for propelling the vehicles, having a throttle controlled suction passage, the combination with a power actuator located on the tractor, comprising a cylinder closed at both ends and a piston in said cylinder connected with brake mechanisms for the tractor, a power actuator located on the trailer, comprising a cylinder closed at both ends, and a piston therein connected with brake mechanisms for the trailer, tubular connections for connecting each of said cylinders forward of their pistons at all times with the suction passage of the engine, a single controlling valve mechanism on the tractor, tubular connections therefrom to each cylinder in rear of the piston, means for connecting said valve mechanism with the suction passage and with a source of higher fluid pressure, and an operator operated part for said controlling valve mechanism located on the tractor, of an independent pressure regulating valve in each portion of the aforementioned connections interconnecting said controlling valve and each of said actuator cylinders, provided with a valve member for closing said connections, a yielding resistance normally holding said valve member in open position, a pressure operated part subjected on one face at all times to the suction of the suction passage and on the other face to said suction and to the higher pressure fluid under the control of said valve mechanism, connections between said pressure operated part and said valve and said yielding resistance, and hand operated means for varying the tension of said yielding resistance, whereby said actuators may be operated substantially simultaneously to apply the brake mechanisms of tractor and trailer to a maximum extent as to each, determined by the pressure regulating valve therefor, said operator operated part being operatively connected with the brake mechanisms for the tractor, to enable the operator to apply his physical force to said brake mechanisms in addition to the power applied thereto by the actuator connected therewith, and to apply said brake mechanisms of the tractor by physical force in case of failure of power.

5. In a brake system for automotive vehicles including a tractor and trailer, provided with an internal combustion engine located on the tractor for propelling the vehicles, having a throttle controlled suction passage, the combination with a power actuator located on the tractor, comprising a cylinder closed at both ends and a piston in said cylinder connected with brake mechanisms for the tractor, a power actuator located on the trailer, comprising a cylinder closed at both ends, and a piston therein connected with brake mechanisms for the trailer, tubular connections for connecting each of said cylinders forward of their pistons at all times with the suction passage of the engine, a single controlling valve mechanism on the tractor, tubular connections therefrom to each cylinder in rear of the piston, means for connecting said valve mechanism with the suction passage and with a source of higher fluid pressure, and an operator operated part for said controlling valve mechanism located on the tractor, of an independent pressure regulating valve in the connections between said controlling valve and each of said actuator cylinders, each of said regulating valves being provided with a valve member for closing said connections, a yielding resistance normally holding said valve member in open position, a pressure operated part subjected on one face at all times to the suction of the suction passage and on the other face to said suction and to the higher pressure fluid under the control of said valve mechanism, connections between said pressure operated part and said valve and said yielding resistance, and hand operated means for varying the tension of said yielding resistance, whereby said actuators may be operated substantially simultaneously to apply the brake mechanisms of tractor and trailer to a maximum extent as to each, determined by the pressure regulating valve therefor, and means for holding said controlling valve mechanism when in released position, in position to connect each actuator cylinder in rear of the piston therein with said suction passage to maintain said piston submerged in vacuum.

In testimony whereof we affix our signatures.

CALEB S. BRAGG.
VICTOR W. KLIESRATH.